Feb. 3, 1970 S. M. ELLIS 3,492,870

PRESSURE TRANSDUCER

Filed March 21, 1968 3 Sheets-Sheet 1

INVENTOR
STAFFORD M. ELLIS
BY
ATTORNEY

INVENTOR
STAFFORD M. ELLIS
BY
ATTORNEY

Feb. 3, 1970 S. M. ELLIS 3,492,870

PRESSURE TRANSDUCER

Filed March 21, 1968 3 Sheets-Sheet 3

INVENTOR
STAFFORD M. ELLIS
BY
ATTORNEY

United States Patent Office 3,492,870
Patented Feb. 3, 1970

3,492,870
PRESSURE TRANSDUCER

Stafford Malcolm Ellis, Lewisham, England, assignor to Elliott Brothers (London) Limited, London, England, a British company Filed Mar. 21, 1968, Ser. No. 714,996
Claims priority, application Great Britain, Mar. 23, 1967, 13,622/67
Int. Cl. G01l 9/00
U.S. Cl. 73—398 9 Claims

ABSTRACT OF THE DISCLOSURE

A transducer for providing an electrical output in response to a fluid pressure applied thereto has a pivotally mounted coil, fluid pressure applied to the coil causing the coil to move in a flux gap formed by two magnetic cylinders mounted one within the other. A pick-off sensing the displacement of the coil feeds an energising current to the coil so that by magnetic interaction any displacement is reduced to zero, the energising current providing an indication of the magnitude of the fluid pressure applied.

This invention relates to pressure responsive transducers for use in force balance arrangement.

The present invention provides a transducer for providing an electrical output in response to a fluid pressure applied thereto, comprising a coil pivotally mounted about an axis substantially perpendicular to and spaced from the longitudinal axis of the coil, magnetic means housing at least a portion of said coil, said coil being movable about its pivotal axis relative to said magnetic means in response to a fluid pressure applied to said coil, sensing means operative to sense displacement relative to said magnetic means of said coil from a predetermined position and energising means responsive to said sensing means to energise said coil to cause interaction between said coil and said magnetic means whereby to tend to maintain said coil in its predetermined position, the output of said energising means forming said electrical output.

The present invention further provides a transducer for providing an electrical output in response to a fluid pressure applied thereto, comprising first and second magnetic cylinders mounted one within the other to form an annular air gap therebetween, an electrical coil pivotally mounted about an axis substantially perpendicular to its longitudinal axis, said coil being so dimensioned and so spaced from its pivotal axis as to be movable in said air gap, bellows means within the inner of said magnetic cylinders and having one end rigid with said coil whereby to cause an angular deflection of said coil about said axis in response to a said fluid pressure applied to said bellows means, sensing means responsive to the angular displacement of said coil, and energising means operable in dependence upon said sensing means to energise said coil whereby the magnetic interaction set up between said coil and said first and second magnetic cylinders opposes and reduces substantially to zero the angular displacement of said coil produced by said fluid pressure, the output of said energising means forming said electrical output.

A pressure responsive transducer in accordance with the invention is hereafter described, by way of example, with reference to the accompanying diagrammatic drawings in which.

Figure 2:
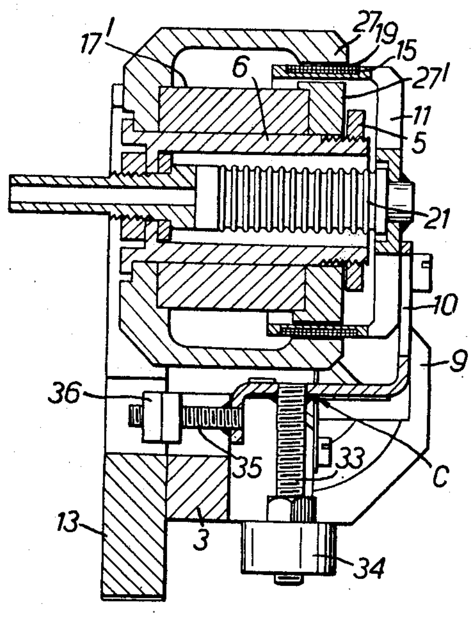
FIGURE 2 shows a section on the line A—A of FIGURE 1.
Figure 3:
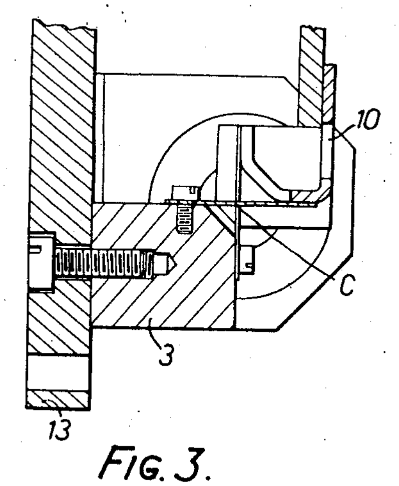
FIGURE 3 is a scrap sectional view taken on the line B—B of FIGURE 1.

The transducer comprises a cylindrical coil former 11 which is shaped to provide a supporting spider at one end. An angled member 10 has one arm rigidly secured to the supporting spider of the coil former and the other arm mounted by means of two pairs of crossed leaf springs 31 and 31' (FIGURE 2) to be pivotal about an axis C with respect to a frame 13. An electrical coil 15 is wound in a slot in the periphery of the coil former 11. Two magnetic cylinders 17 and 17' are mounted one within the other on the frame 13. A flange **17*a* extending inwardly from the outer cylinder 17 completes the magnetic circuit between the two cylinders at one end. At the other end of the two cylinders two mutually facing pole pieces 27 and 27', respectively mounted at the ends of the two cylinders 17 and 17', form an annular flux gap 19 which extends around the coil 15. The coil former 11 can be pivoted about an axis C whereby to displace coil 15 relative to the flux gap 19 by bellows 21 which are connected at one end to a source of fluid pressure and at the other end to the supporting spider by means of a rod 8 extending through an aperture therein and rigidly secured thereto. The frame 13 includes a cylindrical sleeve 6 extending through the inner magnetisable cylinder 17' to provide a support therefor and to house the bellows 21. The cylindrical sleeve 6 is provided with an annular abutment member 5 at its left-hand end (as viewed in FIGURE 4). The abutment member 5 limits the axial movement to the right (as viewed in FIGURE 4) of the former 11** by co-acting with the supporting spider thereof.

The transducer also includes an inductive pick-off 25 to sense angular rotation of the angled member 10 with respect to the mounting frame 13 about the axis C. The pick-off has rotor 23 mounted on a stub shaft 4 rigidly secured to the angled member 10 by means of a mounting plate 7 so that the stub shaft 4 lies on the pivotal axis C. The stator of the pick-off is rigidly secured to the frame 13 by means of a further mounting plate 9.

The two pairs of cross-leaf springs 31, 31' are mounted on a projecting mounting block 3 of the frame 13, so as to locate the pivot axis C in a transverse plane which passes through the flux gap 19 and is substantially midway between the ends of the flux gap.

Figure 5:
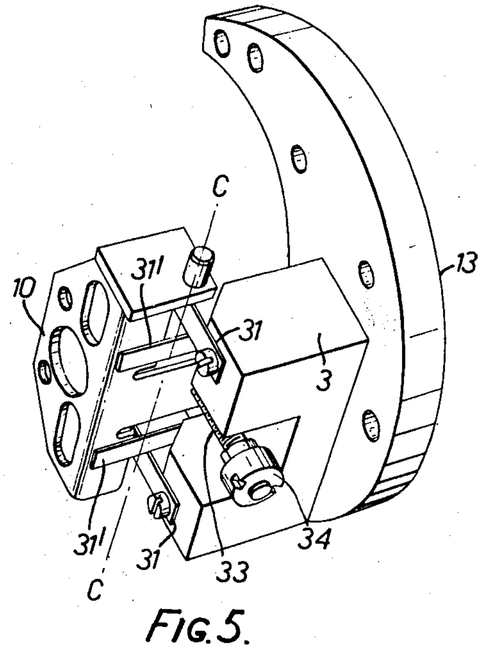
FIGURE 5 is a perspective view of part of the transducer.
Figure 4:
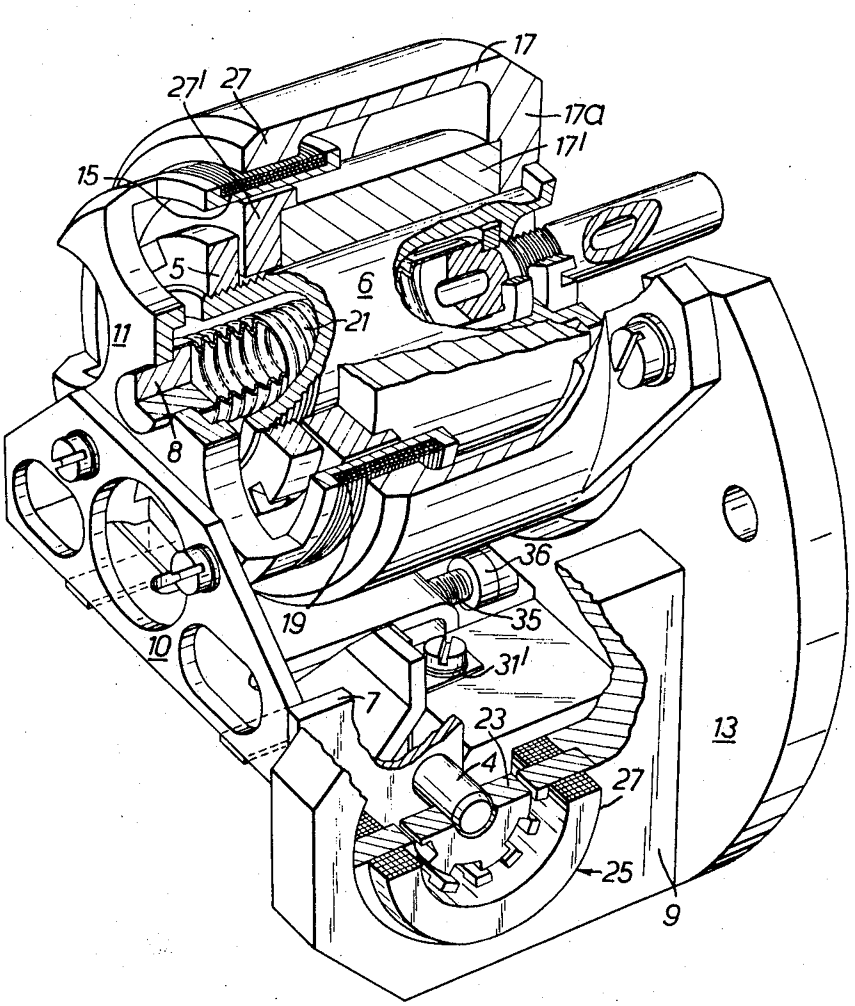
FIGURE 4 is part sectional perspective view of the transducer.

The pivotally mounted arm of the angled member 10 is provided with a downwardly extending threaded rod 33 (FIGURE 5) and a horizontally extending rod 35 (FIGURE 4). Balance weights 34 and 36 are threadedly engaged with the rods 33 and 35 respectively so as to be movable thereon to provide dynamic balancing of the angled arm 10 about the pivot axis C and thereby to render the system substantially insensitive to accelerations.

Figure 1:
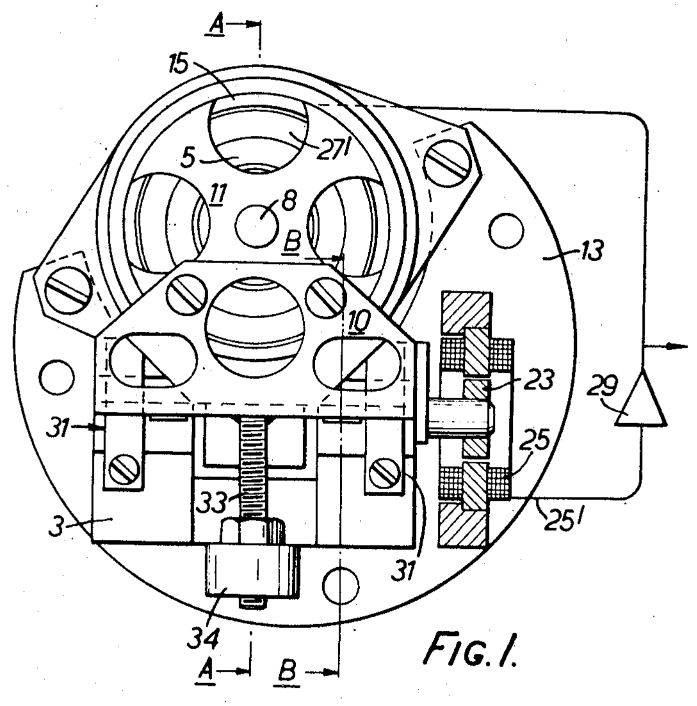
FIGURE 1 depicts an end of the transducer.

The output winding of inductive pick-off 25 is connected to an amplifier 29 (FIGURE 1). The output of the amplifier 29 is in turn connected to the coil 15.

Thus in operation movement of the form 11 under the action of the bellows 21 produces an output signal from the pick-off 25 representative of the out of balance condition of the former that is, representative of the amount by which the coil is displaced from its position of symmetry with respect to the gap 19. This signal is, after amplification by the amplifier 29 employed to control the current in the coil 15 so that, as a result of the interaction between the coil 15 and the magnetic cylinders 17, 17′ the coil moves in the flux gap 19 back to the position of symmetry so as to null the signal at the pick-off output. A further output from the amplifier may be taken which when the former is in the null position will provide an indication of the pressure in the bellows 21. Any small movement of the former 11 under the action of the bellows 21 produces a small movement of the coil 15 the last mentioned movement being substantially rectilinear as a result of the location of the pivot axis C with respect to the flux gap 19 thus enabling the bellows to operate in a simple flexure mode. This also enables the transducer to be relatively compact.

The former 11 is advantageously of aluminum so as to provide maximum eddy current damping.

The bellows 21 are advantageously of the thin walled electro-plate deposited type having a very low spring rate.

I claim:

1. A transducer for providing an electrical output in response to fluid pressure applied thereto comprising
a first magnetic cylinder,
a second magnetic cylinder, said second magnetic cylinder having a bore greater than the outer diameter of said first magnetic cylinder,
a supporting frame,
means mounting said first and second magnetic cylinders on said supporting frame, said first cylinder lying within said second cylinder to define an annular flux gap therebetween,
an electrical coil,
means pivotally mounting said electrical coil on said supporting frame for movement in said flux gap about an axis perpendicular to and spaced from the longitudinal axis of the coil,
fluid pressure responsive bellows housed within said first magnetic cylinder having a first and second end,
means connecting the first end of said bellows to a source of fluid pressure and securing the second end of said bellows rigid with said coil, for angular deflection of said coil about its pivotal axis in response to fluid pressure from said source,
sensing means adapted to sense angular displacement of said coil with respect to said supporting frame having an output providing an output signal in dependence thereon, and
electrical energising means having an input and a output, said input being connected to the output of said sensing means to receive said output signal, and the output of the energising means being electrically connected to the coil for the energisation of the coil to cause a magnetic interaction between the coil and the first and second cylinders opposing and tending to redress any angular displacement of the coil produced by said fluid pressure, the output of said energising means providing the electrical output of said transducer.

2. A transducer according to claim 1 wherein the pivotal axis of the coil lies in a plane perpendicular to the longitudinal axis of the first and second magnetic cylinders, said plane passing mid-way through the flux gap.

3. A transducer according to claim 1 wherein said means pivotally mounting said coil comprises a crossed spring arrangement.

4. A transducer according to claim 3 wherein said means pivotally mounting said coil further comprises a conductive former on which the coil is mounted and to which the crossed spring arrangement is attached.

5. A transducer according to claim 1 wherein said sensing means comprises a rotary inductive pick-off device having its axis of rotation co-axial with the pivotal axis of said coil.

6. A transducer according to claim 1 wherein said energising means includes amplifying means.

7. A transducer according to claim 1 including counterbalancing means rigidly secured to said coil about its pivotal axis for rendering the coil insensitive to linear accelerations in the direction of its longitudinal axis.

8. A transducer for providing an electrical output in response to a fluid pressure applied thereto comprising,
an electrical coil,
a supporting frame,
first means pivotally mounting said coil on said supporting frame about an axis perpendicular to and spaced from the longitudinal axis of the coil,
a first magnetic cylinder, and
a second magnetic cylinder, said second magnetic cylinder having a bore greater than the outer diameter of said first magnetic cylinder,
second means mounting said first and second magnetic cylinders on said supporting frame to cause said cylinders to define an annular flux gap at least a portion of said coil being housed within said annular flux gap,
bellows,
means connecting said bellows between said coil and a source of fluid pressure, said bellows lying housed within the first magnetic cylinder being responsive to fluid pressure from said fluid source to cause said coil to pivot about its pivotal axis relative to said magnetic cylinders in dependence thereon,
sensing means adapted to sense displacement of said coil from a predetermined position, said displacement being relative to said magnetic cylinders, said sensing means having an output providing an output signal in dependence upon any said displacement, and
electrical energising means having an input and an output, said input being electrically connected to the output of said sensing means to receive said output signal, and said output of the energising means being electrically connected to said coil for energising said coil to cause interaction between the coil and the magnetic cylinders tending to maintain the coil in said predetermined position, the output of said energising means providing the electrical output of said transducer.

9. A transducer for providing an electrical output in response to a fluid pressure applied thereto comprising,
an electrical coil,
a supporting frame,
first means pivotally mounting said coil on said supporting frame about an axis perpendicular to and spaced from the longitudinal axis of the coil,
a first magnetic cylinder, and
a second magnetic cylinder, said second magnetic cylinder having a bore greater than the outer diameter of said first magnetic cylinder,
second means mounting said first and second magnetic cylinders on said supporting frame to cause said cylinders to define an annular flux gap so that the longitudinal axis of the first and second magnetic cylinders lies perpendicular to a plane passing midway through the flux gap, and containing the pivotal axis of the coil, at least a portion of said coil being housed within said flux gap,
means supplying a fluid pressure to said coil for causing said coil to move in dependence thereon about its pivotal axis, the movement of said coil being relative to said magnetic cylinders, sensing means adapted to sense displacement of said coil from a predetermined position, said displacement being relative to said magnetic cylinders, said sensing means having an output providing an output signal in dependence upon any said displacement, and electrical energising means having an input and an output, said input being electrically connected to the output of said sensing means to receive said output signal, and said output of the energising means being electrically connected to said coil for energising said coil to cause interaction between the coil and the magnetic cylinders tending to maintain the coil in said predetermined position, the output of said energising means providing the electrical output of said transducer.

References Cited

UNITED STATES PATENTS

| | | | |
|---|---|---|---|
| 2,788,664 | 4/1957 | Coulbourn et al. | 73—398 |
| 2,980,835 | 4/1961 | Williams | 73—398 XR |
| 3,372,594 | 3/1968 | Bristol | 73—398 |

DONALD O. WOODIEL, Primary Examiner

U.S. Cl. X.R.

73—410; 336—30, 135